United States Patent Office 3,029,251
Patented Apr. 10, 1962

3,029,251
BENZOTHIAZEPINE DERIVATIVES
Otis E. Fancher and Gust Nichols, Elkhart, Ind., assignors to Miles Laboratories, Inc., Elkhart, Ind., a corporation of Indiana
No Drawing. Original application Sept. 15, 1958, Ser. No. 760,871. Divided and this application Dec. 7, 1959, Ser. No. 857,568
3 Claims. (Cl. 260—327)

This invention relates to novel compositions of matter and to methods for their use. More particularly, the invention relates to benzothiazepine derivatives which possess sedative activity.

The compounds of this invention may be designated as carbamyl substituted 2,3,4,5-tetrahydro-1,5-benzothiazepines and may be represented by the following structural formula:

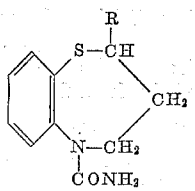

wherein R stands for hydrogen, lower alkyl or lower aryl radicals.

According to the present invention, the various compounds of the defined benzothiazepines can be prepared by reducing the appropriate 2-substituted-4-oxo-2,3,4,5-tetrahydro-1,5-benzothiazepine by means of lithium aluminum hydride and reacting the resulting 2-substituted-2,3,4,5-tetrahydro-1,5-benzothiazepine with nitrourea.

Analytically, these reactions proceed in accordance with the following graphic equations:

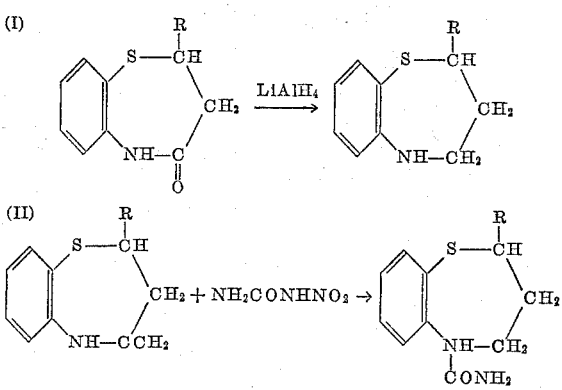

wherein R has the same significance as above.

The 2-substituted-4-oxo-2,3,4,5-tetrahydro-1,5-benzothiazepines used as starting materials for the formation of the benzothiazepine derivatives of this invention may be conveniently prepared by methods known to the art. One such synthesis, according to Mills and Whitworth, J. Chem. Soc., 1927, p. 2742, proceeds as illustrated by the following equation:

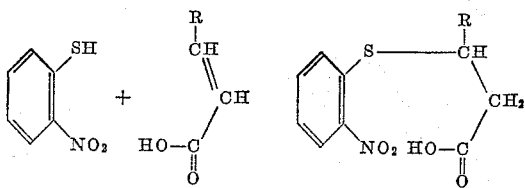

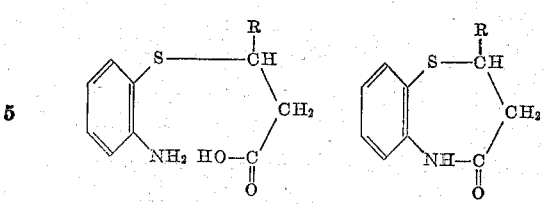

wherein R is H, $CH_3$, $C_6H_5$, $CH_2COOH$.

Other methods of synthesis are described in the following references: Mayer and Horst, Ber. 56, p. 1416 (1923), Reid and Mark, Ber. 90, p. 2683 (1957), and L. K. Muschkalo, Zentr., 127, p. 4435 (1956).

The reduction of these oxidized benzothiazepines by means of lithium aluminum hydride, which is preferably suspended in dry tetrahydrofuran, is carried out by slow addition of the oxidized benzothiazepines to the reducing agent while stirring and gently refluxing the reaction mixture for several hours.

The present compounds may be obtained as free bases having the formula given above, or preferably, as nontoxic, water-soluble addition salts of halogen acids.

The novel compositions of this invention and the process for their preparation will be exemplified by the following illustrative example:

EXAMPLE (A) *2,3,4,5-Tetrahydro-1,5-Benzothiazepine*

The preparation of 4-oxo-2,3,4,5-tetrahydro-1,5-benzothiazepine was carried out according to the procedure of Mayer and Horst, Ber., 56, 1416 (1923), and can be prepared by the procedures of Mills and Whitworth, J.C.S., 1927, p. 2738.

Lithium aluminum hydride, 8.2 g. or 0.215 mole, was suspended in 600 ml. of dry tetrahydrofuran. To this suspension was added over a period of one half hour 38.5 g. (0.215 mole) of the above amide while stirring and maintaining a gentle reflux. The mixture was refluxed for 2½ hours after addition was complete and the cooled reaction mixture was treated with 10 ml. of water, 7.5 ml. of 20% sodium hydroxide and then with an additional 35 ml. of water. The separated salts were filtered and the filtrate was concentrated on a hot water bath to remove solvent. The oily yellow residue was dissolved in ether, dried over potassium carbonate and distilled. There was obtained 30 g. (84%); B.P. 113–115/0.2 mm.

*Analysis.*—Calcd. for $C_9H_{11}NS$: N, 8.48. Found: N, 8.39.

To a cold solution of 10 g. of hydrogen chloride in 75 ml. of isopropanol was added 30 g. of the above thiazepine in 75 ml. of isopropanol. Crystals separated on cooling and these were filtered and dried. There was obtained 36 g. (98%) of product which melted at 214–215°.

*Analysis.*—Calcd. for $C_9H_{12}ClNS$: N, 6.94; Cl, 17.58. Found: N, 7.01; Cl, 17.45.

(B.1) *2-Methyl-2,3,4,5-Tetrahydro-1,5-Benzothiazepine*

The preparation of 2-methyl-4-oxo-2,3,4,5-tetrahydro-1,5-benzothiazepine was carried out by the procedure of Mills and Whitworth, J.C.S., 1927, p. 2742.

Lithium aluminum hydride, 22 gm. (0.58 M), was suspended in 1500 ml. of dry tetrahydrofuran. To this suspension was added 102 gm. (0.528 M) of the above amide while stirring and maintaining a gentle reflux. The mixture was refluxed six hours after addition was complete, and the cooled reaction mixture was treated with 25 ml. of water, 20 ml. of 20% sodium hydroxide and then with an additional 90 ml. of water. The separated salts were filtered and the filtrate concentrated on a hot water bath to remove solvent. The oily yellow residue was extracted with ether, dried over potassium carbonate and distilled. The fraction distilling at 115–120°/0.25 mm. solidified in the receiver. Yield: 78 gm. (82%).

*Analysis.*—Calcd. for $C_{10}H_{13}NS$: N (basic), 7.81. Found: N (basic), 7.70.

A cool solution of 11 gm. of the free base in isopropanol was converted to the hydrochloride. Yield: 12 gm. (90%); M.P. 197–199°.

*Analysis.*—Calcd. for $C_{10}H_{14}ClNS$: Cl, 16.44; N (basic), 6.49. Found: Cl, 16.47; N (basic), 6.53.

(B.2) *2-Phenyl-2,3,4,5-Tetrahydro-1,5-Benzothiazepine*

The preparation of 2-phenyl-4-oxo-2,3,4,5-tetrahydro-1,5-benzothiazepine was carried out by the procedure of Mills and Whitworth, J.C.S., 1927, p. 2742.

Lithium aluminum hydride, 12 gm. (0.316 M) was suspended in 1200 ml. of dry tetrahydrofuran. To this suspension was added 75 gm. (0.294 M) of the above amide, while stirring and maintaining a gentle reflux. The mixture was refluxed four hours after addition was complete, and the cooled reaction mixture was treated with 14 ml. water, 11 ml. of 20% sodium hydroxide and then with an addition of 48 ml. of water. The separated salts were filtered and the filtrate concentrated on a hot water bath to remove solvent. The residue was distilled. Yield: 54 gm. (76%); B.P. 190–200°/0.1 mm.

*Analysis.*—Calcd. for $C_{15}H_{15}NS$: N (basic), 5.80. Found N (basic), 5.82.

The free base was converted to the hydrochloride in isopropanol, in which it was only slightly soluble. The M.P. 230–232°.

*Analysi.*—Calcd. for $C_{15}H_{16}ClNS$: Cl, 12.76; N (basic), 5.04. Found: Cl, 12.74; N (basic), 5.10.

(C) *2 - Methyl - 5 - Carbamyl - 2,3,4,5 - Tetrahydro - 1,5-Benzothiazepine*

2 - methyl - 2,3,4,5 - tetrahydro - 1,5 - benzothiazepine (22 gm., 0.123 M), was reacted with 20 gm. (0.19 M) of nitrourea in 150 ml. of isopropanol, refluxed one hour, filtered, and the solvent was removed under reduced pressure. The residue was recrystallized from benzene. Yield: 11 gm. (40%); M.P. 159–160°.

*Analysis.*—Calcd. for $C_{11}H_{14}N_2OS$: N, 12.60. Found: N, 12.64.

The above 2-phenyl-2,3,4,5-tetrahydro-1,5-benzothiazepine may similarly be reacted with nitrourea to obtain a 2 - phenyl - 5 - carbamyl - 2,3,4,5 - tetrahydro - 1,5 - benzothiazepine.

*Pharmacology.*—The A–LD50 is 1100 mg./kg. (Rat-OR). The A–HD50 is 48% of the A–LD50. No convulsions were observed.

It was found that at 20% of the A–LD50 four out of five rats after one hour and five out of five rats after the third hour were sedated.

When screening for motor relaxation, it was seen that none out of five animals failed to stay on the rotarod one and three hours after administration of 20% of the A–LD50.

The compound did not facilitate convulsions in any of the five rats at 20% of the A–LD50 after one and three hours. Two out of five animals were fully protected against electroconvulsions at the same dose one hour after administration.

This application is a division of our application Serial No. 760,871, filed September 15, 1958.

What is claimed is:

1. A compound of the formula

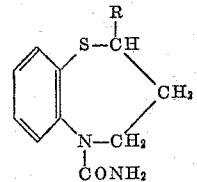

wherein R is a member of the group consisting of hydrogen, lower alkyl and phenyl.

2. 2 - methyl - 5 - carbamyl - 2,3,4,5 - tetrahydro - 1,5-benzothiazepine.

3. 2 - phenyl - 5 - carbamyl - 2,3,4,5 - tetrahydro - 1,5-benzothiazepine.

No references cited.